United States Patent [19]
Choi

[11] Patent Number: 5,128,980
[45] Date of Patent: Jul. 7, 1992

[54] AUTOMATIC PAGING TELEPHONE SET AND METHOD FOR CONTROLLING THEREOF

[75] Inventor: Jin-Ho Choi, Suwon, Rep. of Korea

[73] Assignee: SamSung Electronics Co., Ltd., Suwon, Rep. of Korea

[21] Appl. No.: 545,838

[22] Filed: Jun. 29, 1990

[30] Foreign Application Priority Data

Sep. 8, 1989 [KR] Rep. of Korea ............... 1989-13041

[51] Int. Cl.⁵ ............ H04M 11/00; H04M 1/64; H04M 1/66; G08B 5/22
[52] U.S. Cl. ............................... 379/56; 379/57; 379/58; 379/88; 379/200; 340/825; 340/825.36; 340/825.44; 455/7; 455/18
[58] Field of Search ............. 340/825.44, 825.36, 340/825; 379/40, 56, 57, 58, 60, 61, 62, 67, 88, 170, 200; 455/18, 7

[56] References Cited

U.S. PATENT DOCUMENTS

| | | |
|---|---|---|
| 4,600,809 | 7/1986 | Tatsumi et al. ............. 379/88 |
| 4,868,560 | 9/1989 | Oliwa et al. ............ 340/825.44 |
| 4,882,744 | 11/1989 | Hashimoto ............... 379/57 |
| 4,893,335 | 1/1990 | Fuller et al. ............. 379/200 |
| 4,926,460 | 5/1990 | Gutman et al. ............. 379/57 |

FOREIGN PATENT DOCUMENTS

| | | | |
|---|---|---|---|
| 0046332 | 2/1989 | Japan | 379/58 |
| 0185035 | 7/1989 | Japan | 455/18 |
| 2173071 | 10/1986 | United Kingdom | 379/57 |

*Primary Examiner*—James L. Dwyer
*Assistant Examiner*—William Cumming
*Attorney, Agent, or Firm*—Robert E. Bushnell

[57] ABSTRACT

An automatic paging telephone set comprising first and second DTMF transmitters, a mode selector for selecting either a pager number recording mode, a paging mode, or a general communication mode, and a controller for controlling the telephone set according to the mode selected by the mode selector. When the telephone set is in the recording mode, the pager number data is stored into the memory of the controller. When the telephone set is in the paging mode, the controller stores the caller's telephone number into the memory thereof, and then transmts the pager number and the caller's telephone number to the paging system subscriber.

4 Claims, 4 Drawing Sheets

AUTOMATIC PAGING TELEPHONE SET AND METHOD FOR CONTROLLING THEREOF

BACKGROUND OF THE INVENTION

The present invention generally concerns communication between a telephone set and a radio paging receiver, and more particularly an apparatus for automatically transmitting a caller's telephone number to a radio paging system subscriber by using a telephone set and a method therefor.

Figure 1:
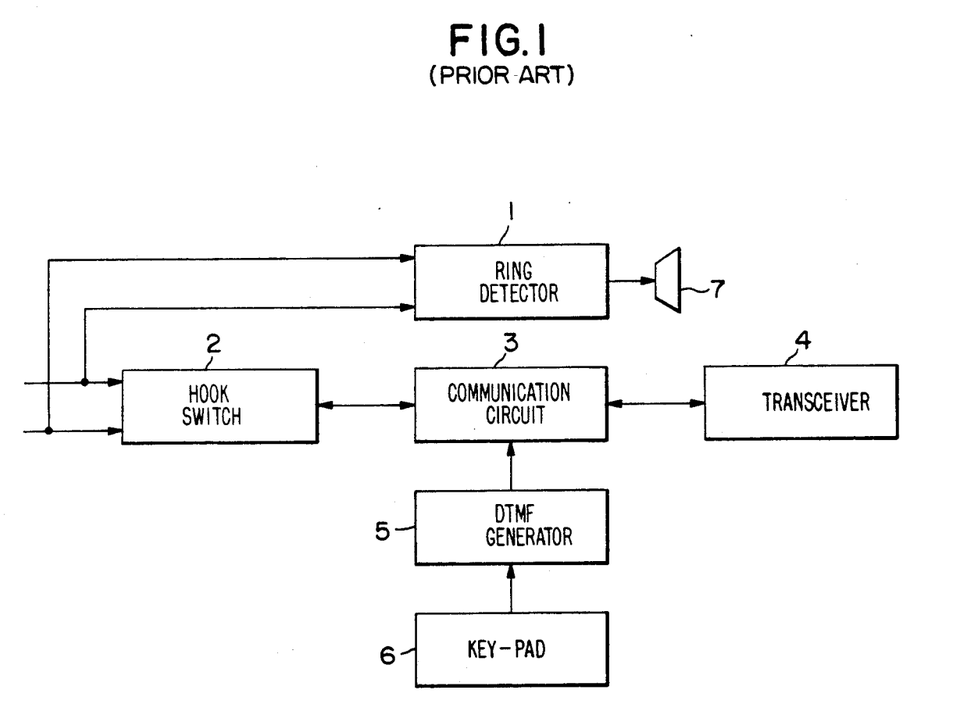
FIG. 1 illustrates a block diagram of a conventional telephone set.

Generally, a MFC (Multi-frequency Code) telephone set has the construction as shown in FIG. 1, wherein the incoming signal causes the exchange system to provide the ring signal detected by ring detector 1 to energize speaker 7. Receiving the incoming signal, the telephone subscriber takes off telephone transceiver 4 so as to cause hook switch 2 to establish a communication line. In order to transmit the signal to another telephone subscriber, the telephone subscriber dials through keypad 6 another telephone subscriber's number, whose signal is converted into a DTMF (dual tone multi-frequency) signal by DTMF generator 5, delivered to the exchange system so as to establish a communication line.

However, with such a conventional telephone set, it is impossible to inform the telephone subscriber, who is absent, of the incoming signal.

SUMMARY OF THE INVENTION

It is an object of the present invention to provide an apparatus for paging the caller's telephone number to the telephone subscriber who is called but absent, by using the MFC telephone set.

It is another object of the present invention to provide a method for storing a pager number of paging system subscriber to automatically transmit a caller's telephone number to the paging system subscriber who is absent, by using the MFC telephone set.

According to the present invention, an automatic paging telephone set comprises a ring detector for detecting the ring signal, a communication circuit for transmitting and receiving a voice signal, a first DTMF transmitter for converting a dialing signal into a DTMF signal, a mode selector for selecting the pager number recording mode, paging mode, and general communication mode, a controller for controlling the operation of the telephone set according to the mode selected by the mode selector, the controller having memory for storing the pager number and the caller's telephone number, a switching circuit driven by the controller for controlling the communication channel, a voice generator driven by the controller for delivering a voiced message to the communication circuit, a DTMF receiver for digitalizing the DTMF signal received from the communication circuit to deliver it to the controller, a tone detector for detecting tone signals of the exchange system and the paging system, through the communication circuit, to deliver them to the controller, and a second DTMF transmitter for converting into a DTMF signal the telephone number data generated by the controller to deliver it to the communication circuit, whereby when the telephone set is in the recording mode, the pager number data generated by the first DTMF transmitter is received by the DTMF receiver to be stored into the memory of the controller, and when the telephone set is in the paging mode, the controller controls the switching circuit and the voice generator according to the ring detecting signal, stores the caller's telephone number into the memory thereof, and then, transmits the pager number and the caller's telephone number to the paging system subscriber according to the states of both the exchange system and the paging system detected by the tone detector.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

The present invention will now be described more specifically with reference to the drawings attached only by way of example.

Figure 2:
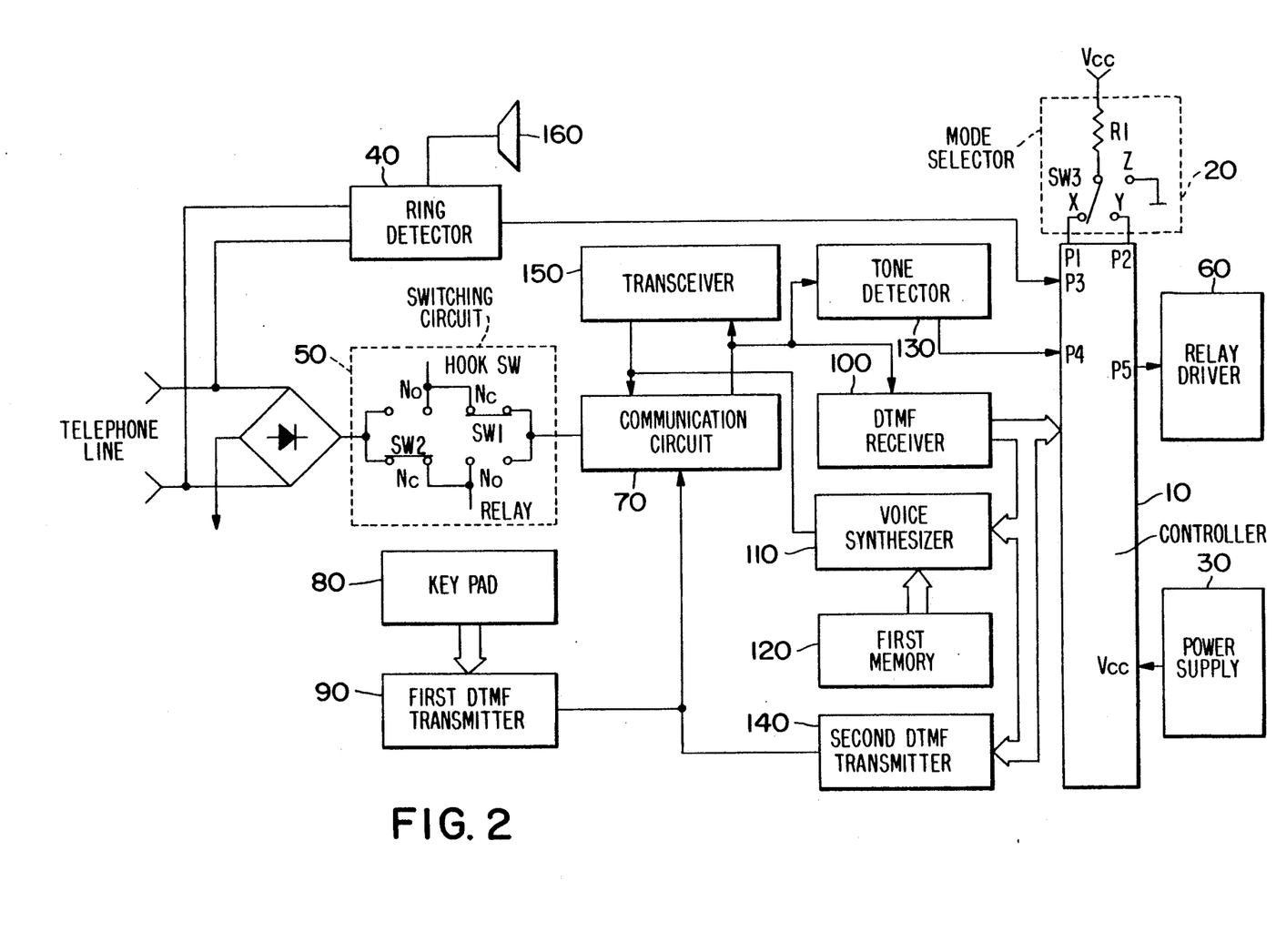
FIG. 2 illustrates a block diagram of a telephone set according to the present invention.

The automatic paging telephone set of the present invention comprises, as shown in FIG. 2, mode selector 20, controller 10, power supply 30, ring detector 40, communication circuit 70, switching circuit 50, relay driver 60, key pad 80, first DTMF transmitter 90, DTMF receiver 100, first memory 120, voice synthesizer 110, tone detector 130, second DTMF transmitter 140, and transceiver 150.

Mode selector 20 includes resistor $R_1$ and mode switch $SW_3$ to select either a pager number recording mode, a paging mode, or a general communication mode. The controller 10 includes a second memory for storing the pager number and a third memory for storing the caller's telephone number, and controls the operation of the telephone set according to the mode selected by mode selector 20.

The power supply 30 supplies controller 10 with power. Ring detector 40 drives speaker 160 to sound the incoming signal received from the exchange system as well as to generate the ring detecting signal to controller 10. Communication circuit 70 transmits and receives a voice signal through telephone transceiver 150. Switching circuit 50 includes a hook switch $SW_1$ driven by transceiver 150 and relay switch $SW_2$ driven a by relay driving signal to control the communication channel. Relay driver 60 is driven by the controller 10 to control the operation of the relay switch $SW_2$.

The first DTMF transmitter 90 converts the dialing signal and the pager number through key pad 80 into DTMF signals and delivers them to communication circuit 70. The DTMF receiver 100 digitalizes the caller's telephone number and the pager number received from the communication circuit 70 and delivers them to controller 10. The first memory 120 stores the voiced message for carrying out the paging function. The voice synthesizer 110 is driven by controller 10 to generate a voiced message of the first memory 120 to communication circuit 70.

Tone detector 130 detects the tone signals representing the states of the exchange system and the paging system through communication circuit 70, delivering them to controller 10. The second DTMF transmitter 140 converts into DTMF signals the pager number data and the caller's telephone number digital data generated by controller 10 to deliver them to communication circuit 70.

Relay driver 60 and the switching circuit 50 serve to establish the communication channel even when the telephone set is hooked-on (the hook switch contacting the NC terminal), and voice synthesizer 110 and the first memory 120 constitute the voice generator for carrying out the paging function for the absent telephone subscriber.

Figure 3:
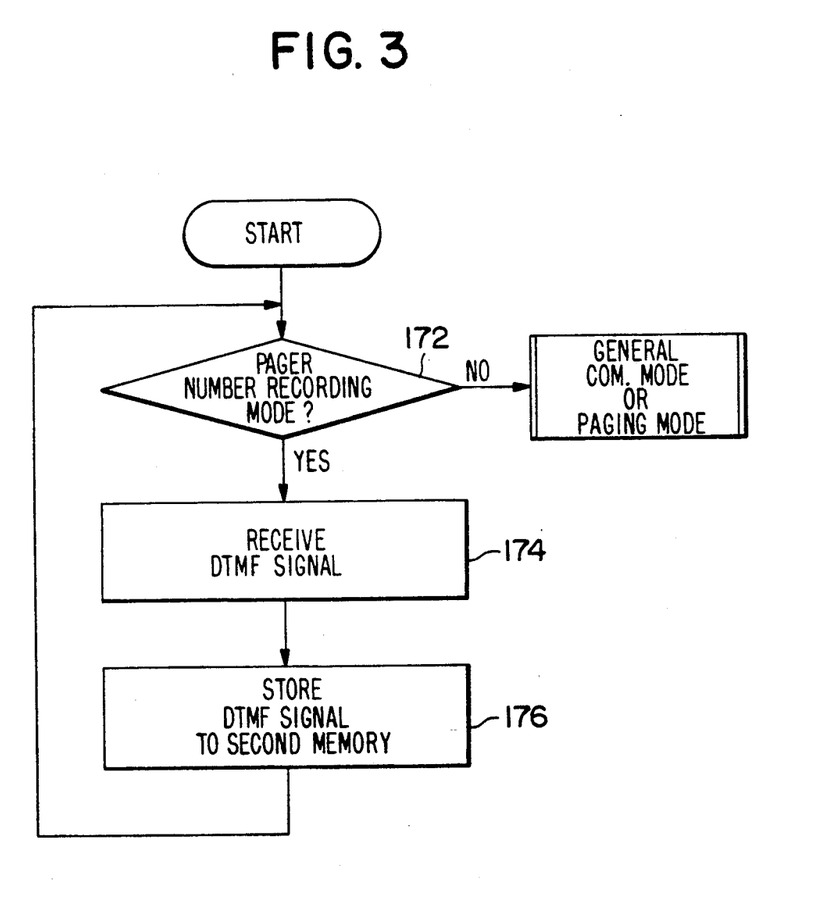
FIG. 3 is a flow chart for storing a specific pager number in the inventive telephone set.
Figure 4:
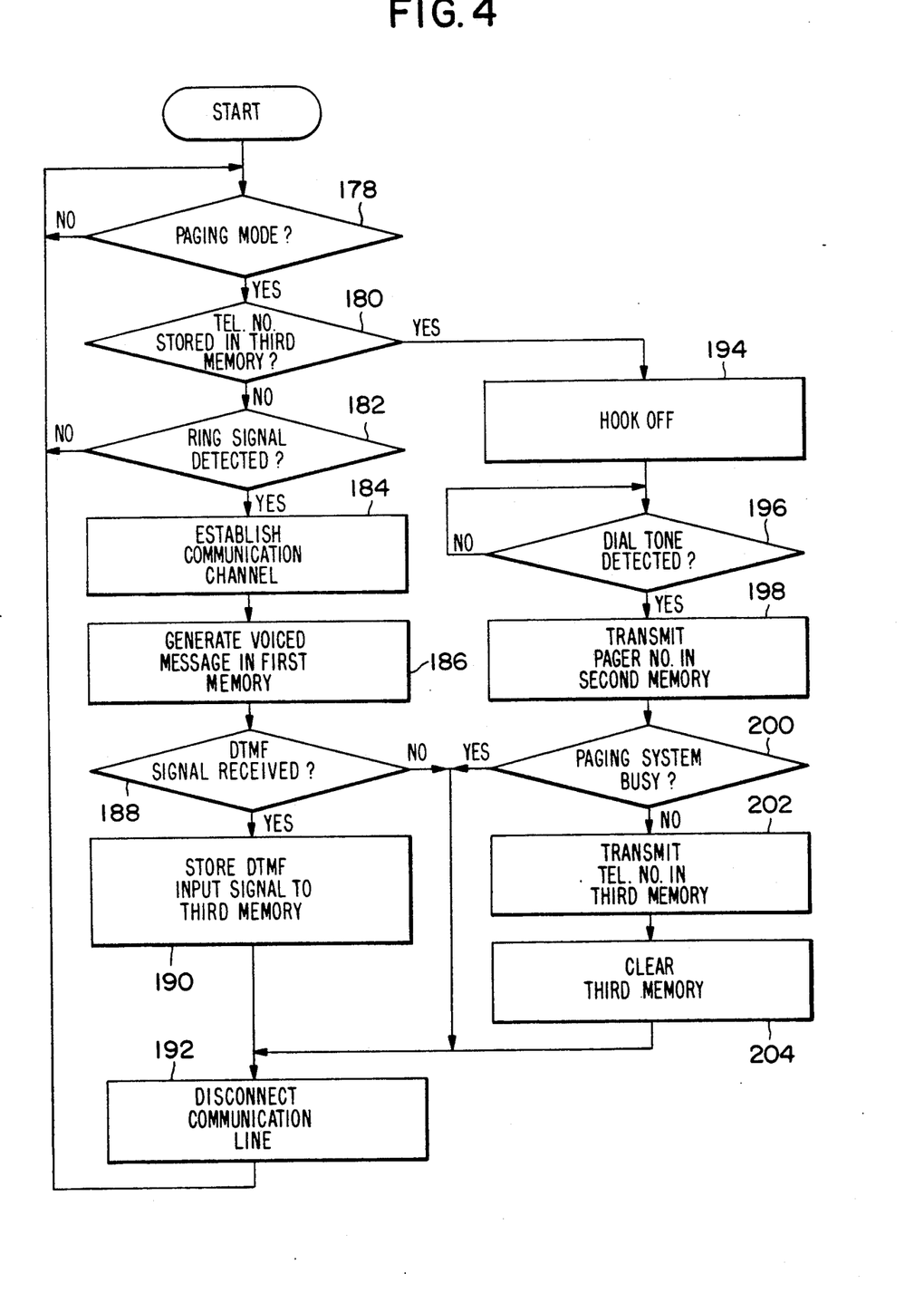
FIG. 4 is a flow chart for carrying out the automatic paging function of the inventive telephone set.

Referring to FIGS. 3 and 4, the process, whereby controller 10 performs the recording mode and the paging mode, includes the steps of:

storing into the internal memory the pager number generated by the first DTMF transmitter in the recording mode and returning;

controlling the switching circuit and the voice generator according to the detected ring signal in the paging mode to establish the communication channel and generate the voiced message;

storing into the internal memory the caller's telephone number received by the DTMF receiver;

re-establishing the communication channel to transmit the pager number through the second DTMF transmitter;

determining by the tone detector whether the state of the paging system is normal or not;

transmitting the caller's telephone number through the second DTMF transmitter if the state of the paging system is normal;

deleting the caller's telephone number from the internal memory; and disconnecting the communication channel.

Controller 10 causes the telephone set to operate in the pager number recording mode, the paging mode, and the general communication mode, respectively, according to the three positions X, Y and Z of the mode switch $SW_3$. In the paging mode, the telephone set automatically transmits the caller's telephone number received to the recorded pager number. Controller 10 includes a one chip microcomputer, which includes a second memory for storing the pager number and a third memory for storing the caller's telephone number. Besides, controller 10 is supplied with a separate power supply in addition to the telephone power source. In switching circuit 50, the first switch $SW_1$ is the hook switch driven by transceiver 150, and the second switch $SW_2$ is the relay switch driven by relay driver 60.

In the general communication mode (the mode switch being in the Z position), the incoming signal causes the exchange system to transmit the ring signal through the telephone line to ring detector 40 so as to sound speaker 160. Here, controller 10 recognizes the general communication mode because the mode switch $SW_3$ is in position Z. At this time, if telephone transceiver 150 is taken off, the hook switch $SW_1$ moves from the NC terminal (Normal Contact) to the NO terminal (Normal Open) so as to establish the communication channel. Hence, the telephone communication may be carried out between the two subscribers. After finishing the communication, transceiver 150 is put onto the telephone set so as to interrupt the communication channel by moving the hook switch $SW_1$ to the NC terminal. Likewise, to transmit the signal, transceiver 150 is taken off to establish the communication line with the exchange system by moving the hook switch $SW_1$ to the NO terminal. Then, if the subscriber dials through key pad 80 the telephone number of another subscriber with whom the subscriber wishes to communicate, the first DTMF transmitter 90 converts the telephone number into a DTMF signal, which is amplified by communication circuit 70, delivered to the exchange system. Finally, the exchange system establishes the communication channel between the two subscribers.

In the pager number recording mode (the mode switch contacting the position X), the telephone subscriber positions the mode switch $SW_3$ in position X, and then, controller 10 recognizes the recording mode. Here, if the subscriber dials its pager number through key pad 80, the first DTMF transmitter 90 converts the pager number into a DTMF signal delivered to communication circuit 70. Then, the communication circuit 70 amplifies the DTMF signal delivered to the DTMF receiver 100, which digitalizes the DTMF signal to deliver it to controller 10. Then, controller 10 stores the received data into the second memory included therein. If the telephone subscriber inputs pager number with the transceiver 150 taken off in the pager number recording mode, the pager receiver is called because of the communication channel established, so that it is checked to determine whether the pager number is correctly inputted or not. Alternatively, if the pager number is inputted with transceiver 150 hooked on, controller 10 stores only the pager number into the second memory.

In the paging mode (the mode switch contacting the position Y), if the ring signal is received through the telephone line, ring detector 40 causes speaker 160 to sound the incoming signal, and delivers the ring detecting signal to port $P_3$ of controller 10. Controller 10 recognizes through port $P_2$ that the mode switch $SW_3$ is positioned in the paging mode, and operates relay driver 60 through port $P_5$. Relay driver 60 moves relay switch $SW_2$ to the NO terminal, thereby establishing the communication channel. Also, controller 10 drives voice synthesizer 110 to transmit the voiced message stored into the first memory 120 to communication circuit 70. Then, the voiced message is transmitted through communication circuit 70 and switching circuit 50 to the telephone line. Here, if the caller receives the voiced message and dials the caller's telephone number, controller 10 receives the telephone number through DTMF receiver 100 to store it into the third memory, and controls relay driver 60 to move relay switch $SW_2$ to the NC terminal so as to interrupt the communication channel. Thereafter, controller 10 controls again relay driver 60 to move relay switch $SW_2$ to the NO terminal, and then, outputs the pager number stored into the second memory. Then, the second DTMF transmitter 140 converts the digitalized pager number into a DTMF signal delivered to communication circuit 70 which transmits the DTMF signal to the exchange system through switching circuit 50. The exchange system communicates the pager number to the paging system, which in turn transmits to the exchange system the tone signal representing whether it may be usable or not. If the paging system generates a busy tone, the telephone set does not transmit the caller's telephone number stored into the third memory. Controller 10 checks, through tone detector 130, whether the paging system generates a busy tone or not. If a busy tone is detected, controller 10 controls relay driver 60 to cause relay switch $SW_2$ to interrupt the communication channel until the busy tone is not detected so as to transmit the caller's telephone number stored into the third memory. The detailed chip specification of FIG. 2 is as follows:

Ring Detector 40 : KA 2410+PC 817
Communication Circuit 70 : MC 34014
First DTMF Transmitter 90 : UN 91260
Second DTMF Transmitter 140 : PCD 3311
Voice Synthesizer 110 : T 6668
DTMF Receiver 100 : MT 8870

Referring again to FIGS. 3 and 4, the process of the for paging function of the inventive construction will now be described.

In step 172, controller 10 detects the position of mode switch $SW_3$. If mode switch $SW_3$ is in position X, controller 10 recognizes the pager number recording mode through port $P_1$, and prepares for storing the pager number received through DTMF receiver 100. Now, if the subscriber dials the pager number through key pad 80, the first DTMF transmitter 90 converts the pager number into a DTMF signal digitalized by DTMF receiver 100. Controller 10 receives the digitalized DTMF signal in step 174, and stores it into the second memory therein in step 176, and then, returns.

In the paging mode, the controller 10 detects the position of mode switch $SW_3$ in step 178. If mode switch $SW_3$ is in position Y, controller 10 recognizes the paging mode through port $P_2$, and checks in step 180 whether a telephone number is stored into the third memory or not. If there is not a telephone number in step 180, indicating that the telephone has not yet been called, controller 10 checks in step 182 whether there is a ring signal or not. If the ring signal is generated from the exchange system, detected by ring detector 40, controller 10 recognizes the ring signal through port $P_3$, and operates relay driver 60 through port $P_5$ in step 184, so that relay switch $SW_2$ is connected to the NO terminal, thereby establishing the communication channel. If relay switch $SW_2$ is connected to the NO terminal, the telephone set gets the same state as if transceiver 150 is unhooked. Thereafter, controller 10 drives voice synthesizer 110 to generate the voiced message stored into the first memory 120, in step 186. The content of the voiced message may be as follows:

"I'm not in the office presently. If you are now using an MFC telephone set, please dial your phone number. Then, I will return your call after a while."

The voiced message is transmitted through communication circuit 70 and switching circuit 50 to the exchange system.

Controller 10 checks in step 188 the caller's telephone number received by DTMF receiver 100. Namely, if the caller dials his telephone number after hearing the voiced message, the dialing signal is applied through switching circuit 50 and communication circuit 70 to DTMF receiver 100 to digitalize it. The digitalized signal is applied to controller 10. Then, controller 10 stores the signal into the third memory in step 190, and controls relay driver 60 to move relay switch $SW_2$ to the NC terminal so as to interrupt the communication channel in step 192. If there is no DTMF signal in step 188, controller 10 proceeds to step 192 to interrupt the communication channel after a predetermined time.

If the caller's telephone number is stored into the third memory as described above, controller 10 recognizes the stored number in step 180, and controls relay driver 60 in step 194 to move relay switch $SW_2$ to the NO terminal. Then, a DC loop is formed in the exchange system, which recognizes the unhooked telephone set, and delivers the dial tone to the telephone set. Thus, the dial tone is supplied through switching circuit 50 and communication circuit 70 to tone detector 130, which transmits it to controller 10. Recognizing the dial tone, controller 10 reads in step 198 the pager number stored into the second memory to transmit it to the second DTMF transmitter 140, which converts the digitalized pager number into a DTMF signal supplied to communication circuit 70. Hence, the pager number is transmitted through the exchange system to the paging system, which in turn informs the exchange system of its state. Namely, if the paging system is in a busy state when called by the exchange system, it produces an intermittent buzzing sound.

The busy tone generated by the paging system is supplied through the exchange system to the telephone set, and then, detected by tone detector 130 to deliver it to controller 10. Controller 10 detects in step 200 output of the tone detector 130 so as to determine the state of the paging system. If the paging system is busy, controller 10 proceeds to the step 192 to move relay switch $SW_2$ to the NC terminal so as to interrupt the communication channel, and then, tries again to transmit the pager number. On the contrary, if it is determined in step 200 that the paging system may be usable, controller 10 reads in step 202 the telephone number stored into the third memory to transmit it, and then, clears the content of the third memory in step 204. The telephone number thus transmitted is converted into a DTMF signal through the second DTMF transmitter 140, delivered to the exchange system. Finally, controller 10 controls relay driver 60 to move relay switch $SW_2$ to the NC terminal, thereby interrupting the communication channel.

Thus, controller 10 automatically receives the caller's telephone number to transmit it to the paging system subscriber and then returns to its original state to be ready for the next calling, while the subscriber catches the caller's telephone number displayed on the LCD (Liquid Crystal Display) of the pager receiver after being called by the pager number, and communicates with the caller.

As described above, the present invention provides an apparatus for automatically paging the caller's telephone number to the telephone subscriber who is called, but absent, by using the MFC telephone set, so that important and urgent business transactions may be effectively carried out.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. An automatic paging telephone set comprising:
a mode selecting switch having first, second, and third settings according to a paging number recording mode, a paging mode and a general communications mode, respectively, connected between a power source and a system controller;
said system controller having a second memory for storing paging number information input from a first dual tone multi-frequency transmitter in response to said mode selecting switch being set in said first setting and a third memory for storing caller number information transmitted by a caller to the telephone set while said mode selecting switch is in said second setting;

a switching circuit, connected to a telephone line, comprising a hook switch driven by a transceiver and a relay switch driven by said system controller via a relay driver for establishing or interrupting a communication channel;

a second dual tone multi-frequency transmitter for receiving data from said controller and for converting said data to a dual tone multi-frequency;

a communication circuit having a first input connected to an output of said first dual tone multi-frequency transmitter and to an output of said second dual tone multi-frequency transmitter, a second input connected to an output of said transceiver, an input-output line connected to said telephone line via said switching circuit and an output connected to said transceiver, a tone detector and a dual tone multi-frequency receiver;

said dual tone multi-frequency receiver digitizes said paging number information transmitted in a dual tone multi-frequency from said first dual tone multi-frequency transmitter and said caller number information transmitted in a dual tone multi-frequency from said caller for storage in said second and third memories, respectively; and a ring detector connected to said telephone line for driving a speaker and for providing a ring detected signal to said system controller.

2. The automatic paging telephone set as claimed in claim 1, further comprising a first memory for storing an audio message; and a voice synthesizer for receiving said audio message and for transmitting a voice message over said telephone line to said caller via said communication circuit in response to a first control signal from said system controller.

3. The automatic paging telephone set as claimed in claim 1, wherein said system controller operates said relay driver when a ring detected signal is received from said ring detector while said mode selecting switch is in said second setting, said relay driver operates said relay switch to establish said communication channel; and thereafter, said system controller enables said voice synthesizer to receive said audio message and to transmit said voice message to said caller, wherein said voice message instructs said caller to transmit said caller information number.

4. The automatic paging telephone set as claimed in claim 2, wherein said system controller stores said transmitted caller information number into said third memory and operates said relay driver to move said relay switch to interrupt said communication channel; and thereafter, said system controller operates said relay driver to move said relay switch to establish said communication channel, and outputs said paging number information stored in said second memory to said second dual tone multi-frequency transmitter;

said second dual tone multi-frequency transmitter converts said stored paging number information to a dual tone multi-frequency for transmission to a paging system via an exchange system;

said tone detector checks for a tone signal from said paging system via said exchange system, said tone signal indicative of whether or not said paging system is busy or not, and for controlling said system controller in response to said tone signal;

wherein said system controller operates said relay driver to move said relay switch to interrupt said communication channel if said tone signal indicates said paging system is busy; and wherein said system controller outputs said caller information number to said dual tone multi-frequency transmitter for transmission to said paging system if said tone signal indicates said paging system is not busy.

* * * * *

UNITED STATES PATENT AND TRADEMARK OFFICE
CERTIFICATE OF CORRECTION

PATENT NO. : 5,128,980                  Page 1 of 2

DATED : July 7, 1992

INVENTOR(S) : Jin-Ho CHOI

It is certified that error appears in the above-indentified patent and that said Letters Patent is hereby corrected as shown below:

ON THE TITLE PAGE:

In the Abstract;

Bracket [57], line 11,      after "then", change "transmts" to --transmits--;

Column 1, line 36,      before "paging", insert --the--;

Column 2, line 4,      before "of", change "states " to --state--;

line 52,      after "driven", change "a by" to --by a--;

line 54,      before "controller", delete "the";

line 61,      before "communication", delete "the";

Column 3, line 7,      before "switching", delete "the";

Column 4, line 22,      before "pager", insert --the--;

line 23,      before "transceiver", delete "the";

UNITED STATES PATENT AND TRADEMARK OFFICE
CERTIFICATE OF CORRECTION

PATENT NO. : 5,128,980
DATED : July 7, 1992
INVENTOR(S) : Jin-Ho CHOI

It is certified that error appears in the above-indentified patent and that said Letters Patent is hereby corrected as shown below:

Column 5, line 24, before"controller', delete "the".

Signed and Sealed this

Third Day of September, 1996

Attest:

BRUCE LEHMAN

Attesting Officer     Commissioner of Patents and Trademarks